US008849319B2

(12) United States Patent
Zhang et al.

(10) Patent No.: US 8,849,319 B2
(45) Date of Patent: Sep. 30, 2014

(54) METHOD FOR PROCESSING CONFLICT OF COMMUNICATION SERVICE PROCEDURES AND ASSOCIATED DEVICES

(75) Inventors: Juan Zhang, Beijing (CN); Ming Ai, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 634 days.

(21) Appl. No.: 13/201,557

(22) PCT Filed: Feb. 5, 2010

(86) PCT No.: PCT/CN2010/000165
§ 371 (c)(1),
(2), (4) Date: Sep. 30, 2011

(87) PCT Pub. No.: WO2010/091594
PCT Pub. Date: Aug. 19, 2010

(65) Prior Publication Data
US 2012/0009952 A1    Jan. 12, 2012

(30) Foreign Application Priority Data

Feb. 16, 2009  (CN) .......................... 2009 1 0078099

(51) Int. Cl.
*H04W 68/02*  (2009.01)
*H04W 68/00*  (2009.01)
*H04W 76/02*  (2009.01)
*H04W 60/04*  (2009.01)
*H04W 88/02*  (2009.01)
*H04W 60/06*  (2009.01)

(52) U.S. Cl.
CPC ............ *H04W 68/00* (2013.01); *H04W 76/022* (2013.01); *H04W 60/04* (2013.01); *H04W 88/02* (2013.01); *H04W 60/06* (2013.01)
USPC .......................................... 455/458; 370/357

(58) Field of Classification Search
CPC ...................................................... H04W 68/02
USPC ............................................................ 455/458
See application file for complete search history.

(56) References Cited

U.S. PATENT DOCUMENTS 7,228,143 B1 *  6/2007 Hamalainen et al. .......... 455/458
7,576,634 B2 *  8/2009 Beeler et al. .................... 340/7.2
2007/0019575 A1 *  1/2007 Shaheen ......................... 370/310

FOREIGN PATENT DOCUMENTS

| CN | 101022659 | 8/2007 |
| CN | 101150867 | 3/2008 |
| CN | 201160315 | 12/2008 |

OTHER PUBLICATIONS

3GPP, Technical Specification Group Radio Access Network; Evolved Universal Terrestrial Radio Access (E-UTRA) and Evolved Universal Terrestrial Radio Access Network (E-UTRAN); 3GPP TS 36.300 V8.7.0, Dec. 2008.
International Search Report for PCT/CN2010/000165, mailed May 13, 2010.

* cited by examiner

*Primary Examiner* — Huy C Ho
(74) *Attorney, Agent, or Firm* — Foley & Lardner LLP (57) ABSTRACT

A method for processing a conflict of communication service procedures and associated devices are provided, which are used to solve the problem that the user equipment (UE) receiving the circuit switching (CS) domain paging message conflicts with initiating the Non-Access Stratum (NAS) procedure by itself. Said method includes that: the UE receives a first paging message from the network side equipment; when the UE judges the first paging message is a CS domain paging message and that the UE itself is about to initiate an original Non-Access Stratum (NAS) procedure, the UE ignores the first paging message and initiates the original NAS procedure.

20 Claims, 9 Drawing Sheets

METHOD FOR PROCESSING CONFLICT OF COMMUNICATION SERVICE PROCEDURES AND ASSOCIATED DEVICES

The present application is a U.S. National Stage of International Application No.: PCT/CN2010/000165, filed 5 Feb. 2010, designating the United States, and claiming priority to Chinese Patent Application No. 200910078099.6, filed with the Chinese Patent Office on Feb. 16, 2009 and entitled "Method for handling collision of communication service procedures and corresponding devices", both of which are hereby incorporated by reference in their entireties.

FIELD OF THE INVENTION

The present invention relates to the field of wireless communications and particularly to a method for handling collision of communication service procedures, a user equipment and an Evolved Packet System (EPS) mobility management device.

BACKGROUND OF THE INVENTION

In the Long Term Evolution (LTE) mobile communication system, a User Equipment (UE) in the Evolved Packet System (EPS) Mobility Management Idle (EMM-Idle) status initiates on its own initiative an initial Non-Access Stratum (NAS) procedure to the network side for various purposes of transmitting data, signaling, a location update, etc., to the network side.

If the UE in the EMM-Idle status has user data or signaling in the uplink packet switching domain to be transmitted, then the UE initiates a Service Request procedure in the Packet Switching (PS) domain. Through this procedure, the EMM status of the UE is transferred from the EMM-IDLE status to the EMM-Connected status, and an S1 bearer connection between an Evolved NodeB (eNB) and a Mobility Management Entity (MME) and a radio bearer connection between the UE and the eNB are established. The above UE initiated Service Request procedure may alternatively be triggered upon reception of a paging message from the network side, and the UE will initiate the Service Request procedure by transmitting a Service Request message to the network side in the following cases:

1. the UE in the EMM-Idle status receives a paging request message transmitted from the network side;
2. the UE in the EMM-Idle status needs to transmit uplink user data;
3. the UE in the EMM-Idle status needs to transmit uplink signaling of the LTE; and
4. the UE in the EMM-Idle status needs to transmit uplink signaling of the cdma2000 system.

Furthermore, the UE will initiate the Service Request procedure by transmitting an Extended Service Request message to the network side when Mobile Originated/Mobile Terminated (MO/MT) Circuit Switching (CS) fallback is required for the UE in the following cases:

1. the UE in the EMM-Idle or EMM-Connected status needs to transmit a CS fallback request; and
2. the UE in the EMM-Idle or EMM-Connected status needs to transmit a CS fallback response to a CS fallback request upon reception of the CS fallback request transmitted from the network side.

In addition to the Service Request and the Extended Service Request message transmitted from the UE, the UE in the idle status may also transmit other messages corresponding to the initial NAS procedure including a Tracking Area Update Request message corresponding to a Tracking Area Update (TAU) procedure, a Detach Request message corresponding to a Detach procedure, etc.

A processing flow of a paging procedure in an existing mobile communication system is as follows.

In a paging message from an MME to an eNB, the MME indicates in a CN domain IE indicator whether the paging procedure corresponding to the paging message is triggered for the Circuit Switching (CS) domain or the packet switching domain. The eNB transmits the paging message to a UE, the UE transmits a Service Request message to the MME upon judging from the CN domain IE indicator in the paging message that the paging procedure corresponding to the paging message is triggered for the PS domain, the MME initiates a context setup procedure upon reception of the Service Request to establish an S1 bearer connection between the eNB and the MME and a radio bearer connection between the UE and the eNB, and the UE and the network side can transmit data over the established bearer connections after the bearer connections are established; and the UE transmits an Extended Service Request message to the MME upon judging from the CN domain IE indicator in the paging message that the paging procedure corresponding to the paging message is triggered for the CS domain, the MME determines from a Circuit Switched Fall Back (CSFB) response IE indicator in the Extended Service Request message whether the UE transmitting the Extended Service Request message accepts the request for the paging procedure triggered for the CS domain, and when the CSFB response IE indicator indicates that the UE accepts the request for the paging procedure triggered for the CS domain, the system performs the following operations:

1. the MME initiates a context setup procedure to establish an S1 bearer connection between the eNB and the MME and a radio bearer connection between the UE and the eNB and instructs the eNB to perform a Circuit Switched Fall Back (CSFB) procedure; and
2. the eNB initiates a PS handover according to the instruction of the MME to transfer the UE from a System Architecture Evolution (SAE) system to a GSM/EDGE Radio Access Network (GERAN) system or a Universal Terrestrial Radio Access Network (UTRAN) system; or the eNB performs a Network Assisted Cell Change (NACC) procedure according to the instruction of the MME.

When the UE is in the EMM-Connected status, the system is required to perform only the operation 2 among the foregoing operations to initiate a PS handover or perform an NACC procedure.

When then CSFB response IE indicator indicates that the UE refuses the request for the paging procedure triggered for the CS domain, the MME transmits an SGsAP-PAGING-REJECT message to a Mobile Switching Center (MSC) via an SGs interface between itself and a Visited Location Register (VLR), so that the VLR triggers a User determined UE busy (UDUB) procedure.

When the UE receives a paging message which indicates that the paging procedure corresponding to the paging message is triggered for the CS domain, if the UE is going to initiate an EMM procedure or a Service Request procedure, then there is no description in any existing protocol regarding how the UE will operate. Therefore there is a need of method for handling collision of a received paging message which indicates that the paging procedure corresponding to the paging message is triggered for the CS domain with an NAS procedure (including an EMM procedure and a Service Request procedure) initiated by a UE on its own initiative.

SUMMARY OF THE INVENTION

An embodiment of the invention provides a method for handling collision of communication service procedures to address the problem of collision of a paging message which indicates that the paging procedure corresponding to the paging message is triggered for the CS domain and is received by a UE with an NAS procedure initiated by the UE on its own initiative.

Correspondingly, embodiments of the invention further provide a user equipment and an EPS mobility management device corresponding to the method.

Technical solutions according to the embodiments of the invention are as follows.

A method for handling collision of communication service procedures includes: receiving by a user equipment a first paging message transmitted from a network-side device; and ignoring the first paging message and initiating an initial non-access stratum procedure upon judging that a paging procedure corresponding to the first paging message is triggered for the circuit switching domain and that the user equipment is going to initiate the initial non-access stratum procedure.

A method for handling collision of communication service procedures includes: transmitting from a network-side device a first paging message to a user equipment, wherein a paging procedure corresponding to the first paging message is triggered for the circuit switching domain; receiving a corresponding message when the user equipment initiates an initial non-access stratum procedure, wherein the user equipment ignores the first paging message and initiates the initial non-access stratum procedure upon judging that the paging procedure corresponding to the received first paging message is triggered for the circuit switching domain and that the user equipment is going to initiate the initial non-access stratum procedure; and handling by the network-side device the initial non-access stratum procedure initiated by the user equipment according to the received message.

A user equipment includes: a first reception unit configured to receive a first paging message transmitted from a network-side device; a judgment unit configured to judge whether a paging procedure corresponding to the first paging message received by the first reception unit is triggered for the circuit switching domain and whether the user equipment is going to initiate an initial non-access stratum procedure; and a first processing unit configured to ignore the first paging message and initiate the initial non-access stratum procedure when the judgment unit judges that the paging procedure corresponding to the first paging message is triggered for the circuit switching domain and that the user equipment is going to initiate the initial non-access stratum procedure.

An EPS mobility management device includes: a transmission unit configured to transmit a first paging message to a user equipment, wherein a paging procedure corresponding to the first paging message is triggered for the circuit switching domain; a reception unit configured to receive a corresponding message when the user equipment initiates an initial non-access stratum procedure, wherein the user equipment ignores the first paging message and initiates the initial non-access stratum procedure upon judging that the paging procedure corresponding to the received first paging message is triggered for the circuit switching domain and that the user equipment is going to initiate the initial non-access stratum procedure; and a handling unit configured to handle the initial non-access stratum procedure initiated by the user equipment according to the message received by the reception unit.

A method for handling collision of communication service procedures includes: receiving by a user equipment a first paging message transmitted from a network-side device; determining from the type of an initial non-access stratum procedure the way in which a paging procedure corresponding to the first paging message and the initial non-access stratum procedure is handled upon judging that the paging procedure corresponding to the first paging message is triggered for the circuit switching domain and that the user equipment is going to initiate the initial non-access stratum procedure; and handling the paging procedure corresponding to the first paging message and the initial non-access stratum procedure in the determined way.

A method for handling collision of communication service procedures includes: transmitting from a network-side device a first paging message to a user equipment, wherein a paging procedure corresponding to the first paging message is triggered for the circuit switching domain; and handling the paging procedure corresponding to the first paging message upon reception of a response message corresponding to the first paging message transmitted from the user equipment and handling an initial non-access stratum procedure initiated by the user equipment upon reception of a message corresponding to the initial non-access stratum procedure initiated by the user equipment.

A user equipment includes: a reception unit configured to receive a first paging message transmitted from a network-side device; a judgment unit configured to judge whether a paging procedure corresponding to the first paging message received by the reception unit is triggered for the circuit switching domain and whether the user equipment is going to initiate an initial non-access stratum procedure; a determination unit configured to determine from the type of the initial non-access stratum procedure the way in which the paging procedure corresponding to the first paging message and the initial non-access stratum procedure is handled when the judgment unit judges that the paging procedure corresponding to the first paging message received by the reception unit is triggered for the circuit switching domain and that the user equipment is going to initiate the initial non-access stratum procedure; and a handling unit configured to handle the paging procedure corresponding to the first paging message and the initial non-access stratum procedure in the way determined by the determination unit.

An EPS mobility management device includes: a transmission unit configured to transmit a first paging message to a user equipment, wherein a paging procedure corresponding to the first paging message is triggered for the circuit switching domain; a reception unit configured to receive a response message corresponding to the first paging message transmitted from the user equipment or a message corresponding to an initial non-access stratum procedure initiated by the user equipment; a first handling unit configured to handle the paging procedure corresponding to the first paging message when the reception unit receives the response message corresponding to the first paging message transmitted from the user equipment; and a second handling unit configured to handle the initial non-access stratum procedure initiated by the user equipment when the reception unit receives the message corresponding to the initial non-access stratum procedure initiated by the user equipment.

Embodiments of the invention provide practicable solutions to obviating the collision problem in the prior art arising between UE's handling of a paging procedure which corresponds to a paging message and is triggered for the CS domain and an initial NAS procedure to be initiated by the UE on its own initiative.

DETAILED DESCRIPTION OF THE EMBODIMENTS

If an initial NAS procedure initiated by a UE on its own initiative is to be performed when the UE receives a paging message which indicates that the paging procedure corresponding to the paging message is triggered for the CS domain, then a collision problem may arise between handling of a paging procedure due to the paging message and the initial NAS procedure initiated by the UE on its own initiative. Embodiments of the invention propose two solutions in which one of the procedures is selected for proceeding dependent upon a specific situation when the foregoing collision problem arises, and also present specific implementation flows and offer practicable solutions to obviating the foregoing collision problem.

A general implementation principle and specific implementations of the technical solutions according to the embodiments of the invention and their corresponding advantageous effects that can be achieved will be described in details hereinafter with reference to the drawings. Typically a UE and a network-side device cooperate to handle various communication service procedures, and the embodiments of the invention will be described taking an EPS mobility management device as an example.

The First Embodiment

Figure 1:
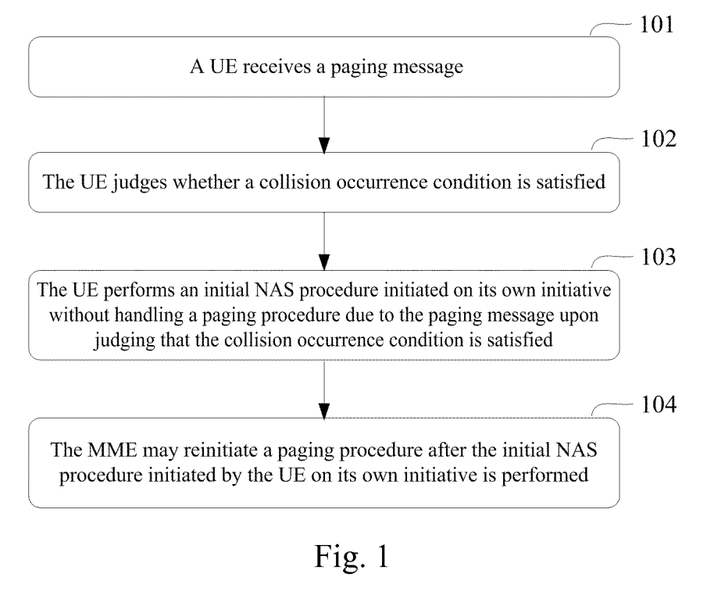
FIG. 1 is a flow chart of implementing a first solution according to an embodiment of the invention.

Reference is made to FIG. 1 illustrating a flow chart of implementing the first embodiment of the invention.

In the operation 101, a UE receives a paging message, transmitted from an MME, corresponding to a paging procedure which is triggered for the CS domain and is initiated by the MME;

In the operation 102, the UE judges whether a collision occurrence condition is satisfied when the paging message is received in the operation 101, that is, whether the UE is going to initiate an initial NAS procedure on its own initiative upon reception of the paging message which indicates that the paging procedure corresponding to the paging message is triggered for the CS domain;

In the operation 103, the UE ignores the paging message and initiates the initial NAS procedure if it is judged in the operation 102 that the collision occurrence condition is satisfied, that is, the UE is going to initiate the initial NAS procedure on its own initiative upon reception of the paging message which indicates that the paging procedure corresponding to the paging message is triggered for the CS domain;

After the foregoing operations are performed, the problem can be addressed that collision may arise with concurrent handling of a paging procedure corresponding to a paging message and an initial NAS procedure initiated by the UE on its own initiative, and the operation 104 may further be performed after the operation 103.

In the operation 104, the MME may reinitiate a paging procedure triggered for the CS domain in the connected status after the MME performs the initial NAS procedure initiated by the UE in the operation 103.

The foregoing processing flow will be described in details below dependent upon the specific type of the initial NAS procedure initiated by the UE on its own initiative.

The UE is going to initiate a Detach procedure on its own initiative, for example, to transmit a Detach Request message corresponding to the Detach procedure, upon reception of a paging message which indicates that the paging procedure corresponding to the paging message is triggered for the CS domain, and at this time the UE ignores the received paging message which indicates that the paging procedure is triggered for the CS domain and initiates a Detach procedure by transmitting the Detach Request message to the MME; and upon reception of the Detach Request message, the MME judges from the type of the NAS procedure being a Detach procedure that it is not necessary to reinitiate a paging procedure after performing the Detach procedure and handles the corresponding Detach procedure.

The UE is going to initiate a Service Request procedure on its own initiative, for example, to transmit a Service Request message corresponding to the Service Request procedure, upon reception of a paging message which indicates that the paging procedure corresponding to the paging message is triggered for the CS domain, and at this time the UE ignores the received paging message and initiates a Service Request procedure, for example, by transmitting a Service Request message, without performing a paging response procedure corresponding to the paging message; and upon reception of the Service Request message transmitted from the UE, the MME terminates corresponding handling of the paging procedure of the UE, judges from the type of the NAS procedure being a Service Request procedure that it is necessary to reinitiate a paging procedure after performing the Service Request procedure, and handles the Service Request procedure corresponding to the received Service Request message. An S1 bearer connection between an eNB and the MME and a radio bearer connection between the UE and the eNB have been established in the Service Request procedure, therefore, after the Service Request procedure initiated by the UE is performed, the MME can reinitiate a paging procedure triggered for the CS domain in the connected status by transmitting a paging message corresponding to the paging procedure.

The UE is going to initiate a TAU procedure on its own initiative, for example, to transmit a Tracking Area Update Request message corresponding to the TAU procedure, upon reception of a paging message which indicates that the paging procedure corresponding to the paging message is triggered for the CS domain, and at this time the UE ignores the received paging message and initiates a TAU procedure by transmitting a Tracking Area Update Request message; and upon reception of the Tracking Area Update Request message transmitted from the UE, the MME terminates corresponding handling of the paging procedure of the UE, judges from the type of the NAS procedure being a TAU procedure that it is necessary to reinitiate a paging procedure after performing the TAU procedure, handles the TAU procedure corresponding to the received Tracking Area Update Request message, and initiates a bearer connection establishment procedure of establishing an S1 bearer connection between the eNB and the MME and a radio bearer connection between the UE and the eNB before releasing an NAS signaling connection which is established due to the TAU procedure, and the MME initiates a paging procedure triggered for the CS domain in the connected status by transmitting a paging message corresponding to the paging procedure after performing the TAU procedure.

After the initial NAS procedure initiated by the UE on its own initiative is performed, whether the MME reinitiates a paging procedure triggered for the CS domain in the connected status can be determined from the type of the performed NAS procedure.

The Second Embodiment

Figure 2:
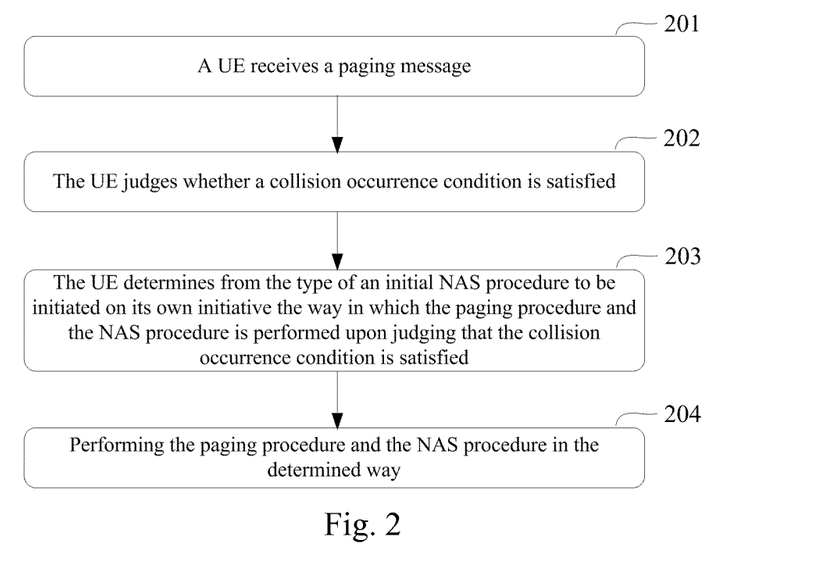
FIG. 2 is a flow chart of implementing a second solution according to an embodiment of the invention.

Reference is made to FIG. 2 illustrating a flow chart of implementing the second embodiment of the invention.

In the operation 201, a UE receives a paging message transmitted from an MME initiating a paging procedure triggered for the CS domain;

In the operation 202, the UE judges whether a collision occurrence condition is satisfied when the paging message is received in the operation 201, that is, whether the UE is going to initiate an initial NAS procedure on its own initiative upon reception of the paging message which indicates that the paging procedure is triggered for the CS domain;

In the operation 203, the UE determines from the type of the initial NAS procedure to be initiated on its own initiative the way in which the paging procedure corresponding to the paging message and the NAS procedure initiated by the UE is handled if it is judged in the operation 202 that the collision occurrence condition is satisfied, that is, the UE is going to initiate the initial NAS procedure on its own initiative upon reception of the paging message which indicates that the paging procedure is triggered for the CS domain; and In the operation 204, the UE handles the paging procedure corresponding to the paging message and the NAS procedure initiated by the UE in the way determined in the operation 203.

The foregoing processing flow will be described in details below dependent upon the specific type of the initial NAS procedure initiated by the UE on its own initiative.

The UE is going to initiate a Detach procedure on its own initiative, for example, to transmit a Detach Request message corresponding to the Detach procedure, upon reception of a paging message which indicates that the paging procedure corresponding to the paging message is triggered for the CS domain, and at this time the UE ignores the received paging message which indicates that the paging is triggered for the CS domain and initiates the Detach procedure by transmitting the Detach Request message corresponding to the Detach procedure without performing a paging response procedure corresponding to the paging message; and upon reception of the Detach Request message, the MME handles the corresponding Detach procedure and judges from the type of the NAS procedure being a Detach procedure that it is not necessary to reinitiate a paging procedure after performing the Detach procedure.

The UE is going to initiate a TAU procedure on its own initiative upon reception of a paging message which indicates that the paging procedure corresponding to the paging message is triggered for the CS domain, and at this time the UE ignores the received paging message, does not perform a paging response procedure corresponding to the paging message, and instead initiates a TAU procedure carrying an "active" flag indicator by transmitting to the MME a Tracking Area Update Request Message, carrying the "active" flag indicator, corresponding to the TAU procedure. Here the paging response procedure corresponding to the paging message includes a Service Request procedure, etc. Upon reception of the Tracking Area Update Request Message transmitted from the UE, the MME terminates the paging procedure corresponding to the UE, judges from the type of the NAS procedure being a TAU procedure that it is necessary to reinitiate a paging procedure after performing the TAU procedure, and handles the corresponding TAU procedure. An S1 bearer connection between an eNB and the MME and a radio bearer connection between the UE and the eNB have been established during handling of the TAU procedure with the "active" flag indicator, therefore, after the TAU procedure is performed, the MME can initiate a paging procedure triggered for the CS domain in the connected status by transmitting a paging message corresponding to the paging procedure to the UE.

The UE is going to initiate a Service Request procedure on its own initiative upon reception of a paging message which indicates that the paging procedure corresponding to the paging message is triggered for the CS domain, and at this time the UE firstly judges whether to accept a paging request corresponding to the paging message, and if the UE accepts the paging request, the UE cancels the Service Request procedure to be initiated and handles a paging procedure by transmitting an Extended Service Request message to the MME; and the MME performs a CSFB procedure upon reception of the Extended Service Request message.

If the UE rejects the paging request, then the UE initiates the Service Request procedure by transmitting a Service Request message to the MME without handling the paging procedure; and upon reception of the Service Request message, the MME terminates the paging procedure of the UE, judges from the type of the NAS procedure being a Service Request procedure that it is necessary to reinitiate a paging procedure after performing the Service Request procedure, and handles the Service Request procedure corresponding to the received Service Request message. An S1 bearer connection between an eNB and the MME and a radio bearer connection between the UE and the eNB have been established during handling of the Service Request procedure, therefore, after the Service Request procedure initiated by the UE is performed, the MME can reinitiate a paging procedure triggered for the CS domain in the connected status by transmitting a paging message corresponding to the paging procedure.

In the present embodiment, the UE handles a Detach procedure and a TAU procedure with priority over a paging procedure corresponding to a paging message upon reception of the paging message which indicates that the paging procedure is triggered for the CS domain. In a practical application, the UE handles an initial NAS procedure of a prescribed specific type initiated on its own initiative prior to a paging procedure corresponding to a paging message upon reception of the paging message which indicates that the paging procedure is triggered for the CS domain.

The embodiments of the invention propose two solutions in which upon judging collision arising between handling of a paging procedure which corresponds to a received paging message and is triggered for the CS domain and an initial NAS procedure initiated by a UE on its own initiative, the UE selects one of the procedures for proceeding dependent upon a specific situation and can proceed with the other procedure after performing the one procedure, and also present specific implementation solutions dependent upon a specific type of an NAS procedure to obviating the collision problem in the prior art arising between UE's handling of the paging procedure which corresponds to the paging message and is triggered for the CS domain and the initial NAS procedure to be initiated by the UE on its own initiative.

Figure 3:
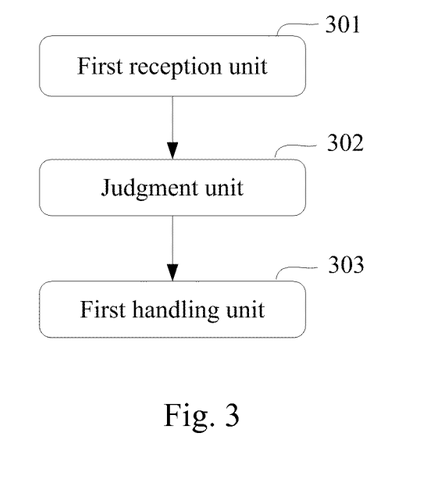
FIG. 3 is a schematic diagram of the structure of a first user equipment according to an embodiment of the invention.

Correspondingly and referring to FIG. 3, an embodiment of the invention further provides a user equipment in correspondence with the first embodiment of the method, which includes a first reception unit 301, a judgment unit 302 and a first handling unit 303, where:

the first reception unit 301 is configured to receive a first paging message transmitted from an EPS mobility management device;

the judgment unit 302 is configured to judge whether a paging procedure corresponding to the first paging message received by the first reception unit 301 is triggered for the circuit switching domain and whether the user equipment is going to initiate an initial non-access stratum procedure; and the first handling unit 303 is configured to ignore the first paging message and initiate the initial non-access stratum procedure when the judgment unit 302 judges that the paging procedure corresponding to the first paging message is triggered for the circuit switching domain and that the user equipment is going to initiate the initial non-access stratum procedure.

Figure 4:
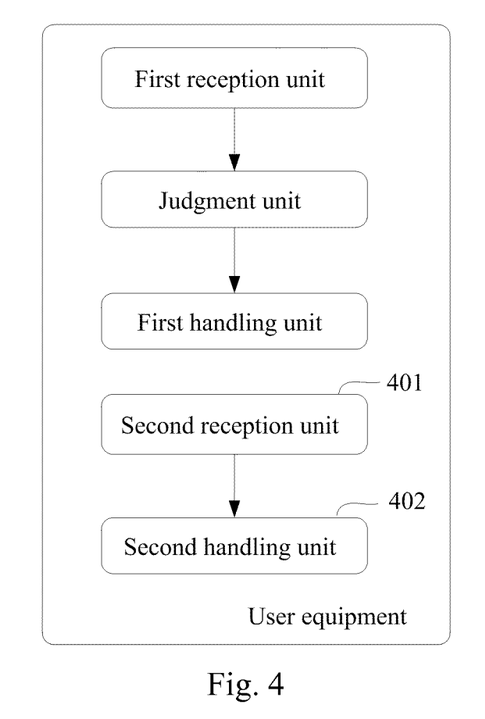
FIG. 4 is a schematic diagram of the structure of a second user equipment according to an embodiment of the invention.

Preferably and referring to FIG. 4, the user equipment may further include a second reception unit 401 and a second handling unit 402, where:

the second reception unit 401 is configured to receive a second paging message which corresponds to a paging procedure triggered for the circuit switching domain in the connected status and initiated by the EPS mobility management device, when the EPS mobility management device determines from the type of an initial non-access stratum procedure initiated by a served user equipment that it is necessary to initiate the paging procedure triggered for the circuit switching domain in the connected status after performing the initial non-access stratum procedure; and the second handling unit 402 is configured to handle the paging procedure triggered for the circuit switching domain in the connected status initiated by the EPS mobility management device according to the second paging message received by the second reception unit 401.

Figure 5:
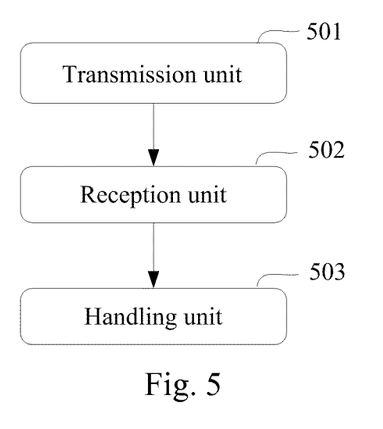
FIG. 5 is a schematic diagram of the structure of a first EPS mobility management device according to an embodiment of the invention.

Referring to FIG. 5, an embodiment of the invention further provides an EPS mobility management device in correspondence with the first embodiment of the method, which includes a transmission unit 501, a reception unit 502 and a handling unit 503, where:

the transmission unit 501 is configured to transmit a first paging message to a user equipment, where a paging procedure corresponding to the first paging message is triggered for the circuit switching domain;

the reception unit 502 is configured to receive a corresponding message when the user equipment initiates an initial non-access stratum procedure, where the user equipment ignores the first paging message and initiates the initial non-access stratum procedure upon judging that the paging procedure corresponding to the received first paging message is triggered for the circuit switching domain and that the user equipment is going to initiate the initial non-access stratum procedure; and the handling unit 503 is configured to handle the initial non-access stratum procedure initiated by the user equipment according to the message received by the reception unit 502.

Figure 6:
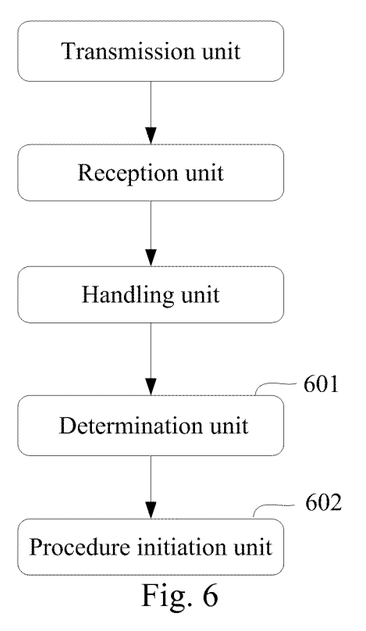
FIG. 6 is a schematic diagram of the structure of a second EPS mobility management device according to an embodiment of the invention.

Preferably and referring to FIG. 6, the EPS mobility management device further includes a determination unit 601 and a procedure initiation unit 602, where:

the determination unit 601 is configured to determine from the type of the initial non-access stratum procedure whether it is necessary to initiate a paging procedure triggered for the circuit switching domain in the connected status after the handling unit 503 in FIG. 5 performs the initial non-access stratum procedure; and the procedure initiation unit 602 is configured to initiate the paging procedure triggered for the circuit switching domain in the connected status and transmit to the user equipment a second paging message corresponding to the initiated paging procedure triggered for the circuit switching domain in the connected status when the determination unit 601 determines that it is necessary to initiate the paging procedure triggered for the circuit switching domain in the connected status.

The user equipment and the EPS mobility management device cooperate to address the collision problem arising with an NAS procedure initiated by the UE on its own initiative when the UE receives a paging message which indicates that the paging procedure corresponding to the paging message is triggered for the CS domain.

Figure 7:
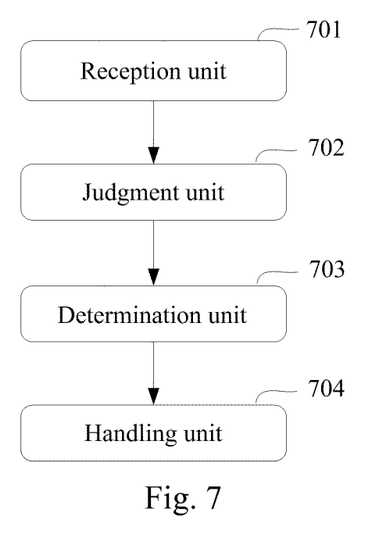
FIG. 7 is a schematic diagram of the structure of a third user equipment according to an embodiment of the invention.

Referring to FIG. 7, an embodiment of the invention further provides a user equipment in correspondence with the second embodiment of the method, which includes a reception unit 701, a judgment unit 702, a determination unit 703, and a handling unit 704, where:

the reception unit 701 is configured to receive a first paging message transmitted from an EPS mobility management device;

the judgment unit 702 is configured to judge whether a paging procedure corresponding to the first paging message received by the reception unit 701 is triggered for the circuit switching domain and whether the user equipment is going to initiate an initial non-access stratum procedure;

the determination unit 703 is configured to determine from the type of the initial non-access stratum procedure the way in which a paging procedure corresponding to the first paging message and the initial non-access stratum procedure is handled when the judgment unit 702 judges that the paging procedure corresponding to the first paging message received by the reception unit 701 is triggered for the circuit switching domain and that the user equipment is going to initiate the initial non-access stratum procedure; and the handling unit 704 is configured to handle the paging procedure corresponding to the first paging message and the initial non-access stratum procedure in the way determined by the determination unit 703.

Figure 8:
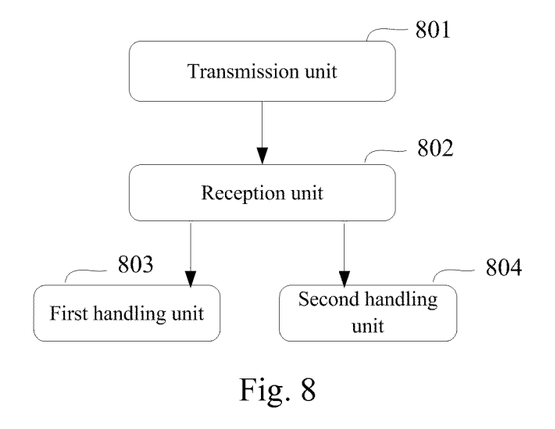
FIG. 8 is a schematic diagram of the structure of a third EPS mobility management device according to an embodiment of the invention.

Referring to FIG. 8, an embodiment of the invention further provides an EPS mobility management device in correspondence with the second embodiment of the method, which includes a transmission unit 801, a reception unit 802, a first handing unit 803, and a second handling unit 804, where:

the transmission unit 801 is configured to transmit a first paging message to a user equipment, where the paging procedure corresponding to the first paging message is triggered for the circuit switching domain;

the reception unit 802 is configured to receive a response message corresponding to the first paging message transmitted from the user equipment or a message corresponding to an initial non-access stratum procedure initiated by the user equipment;

the first handling unit 803 is configured to handle a paging procedure corresponding to the first paging message when the reception unit 802 receives the response message corresponding to the first paging message transmitted from the user equipment; and the second handling unit 804 is configured to handle the initial non-access stratum procedure initiated by the user equipment when the reception unit 802 receives the message corresponding to the initial non-access stratum procedure initiated by the user equipment.

Figure 9:
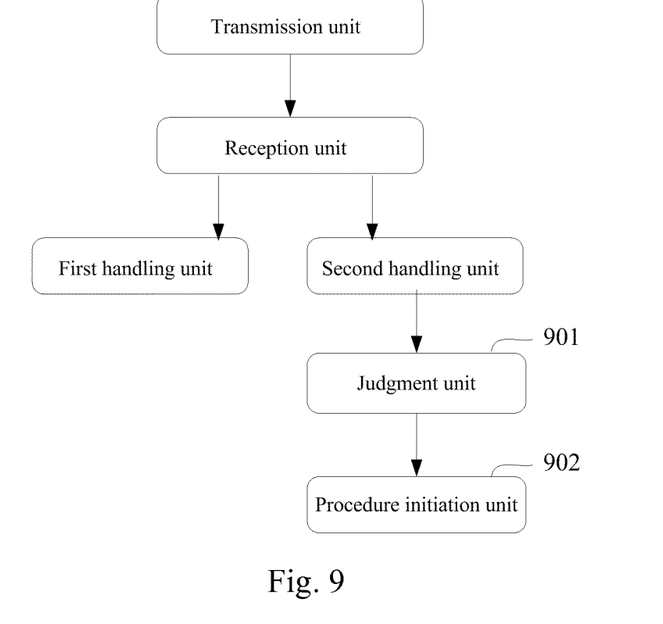
FIG. 9 is a schematic diagram of the structure of a fourth EPS mobility management device according to an embodiment of the invention.

Preferably and referring to FIG. 9, the EPS mobility management device further includes a judgment unit 901 and a procedure initiation unit 902, where:

the judgment unit 901 is configured to judge from the type of the initial non-access stratum procedure whether it is necessary to initiate a paging procedure triggered for the circuit switching domain in the connected status after the second handling unit 804 in FIG. 8 performs the initial non-access stratum procedure; and the procedure initiation unit 902 is configured to initiate the paging procedure triggered for the circuit switching domain in the connected status and transmit to the user equipment a second paging message corresponding to the initiated paging procedure triggered for the circuit switching domain in the connected status when the judgment unit 901 judges that it is necessary to initiate the paging procedure triggered for the circuit switching domain in the connected status.

The user equipment and the EPS mobility management device cooperate to address the collision problem arising with an NAS procedure initiated by the UE on its own initiative when the UE receives a paging message which indicates that the paging procedure corresponding to the paging message is triggered for the CS domain.

Evidently those skilled in the art may make various modifications and variations to the invention without departing from the scope of the invention. Thus the invention is also intended to encompass these modifications and variations thereto as long as the modifications and variations come into the scope of the claims appended to the invention and their equivalents.

The invention claimed is:

1. A method for handling collision of communication service procedures, comprising:
    receiving by a user equipment a first paging message transmitted from a network-side device;
    determining from the type of an initial non-access stratum procedure the way in which a paging procedure corresponding to the first paging message and an initial non-access stratum procedure is handled upon judging that the paging procedure corresponding to the first paging message is triggered for a circuit switching domain and that the user equipment is going to initiate the initial non-access stratum procedure; and
    handling the paging procedure corresponding to the first paging message and the initial non-access stratum procedure in the determined way.

2. The method of claim 1, wherein the user equipment determines the way in which the paging procedure corresponding to the first paging message is ignored and a Detach procedure is initiated when the type of the initial non-access stratum procedure is a Detach procedure.

3. The method of claim 1, wherein the user equipment determines the way in which the paging procedure corresponding to the first paging message is ignored and a Tracking Area Update procedure carrying an "active" indicator is initiated when the type of the initial non-access stratum procedure is a Tracking Area Update procedure.

4. The method of claim 3, wherein the paging procedure corresponding to the first paging message comprises a Service Request procedure.

5. The method of claim 4, further comprising:
    receiving by the user equipment a second paging message which corresponds to a paging procedure triggered for the circuit switching domain in a connected status and initiated by the network-side device, when the network-side device determines from the type of the initial non-access stratum procedure initiated by the user equipment that it is necessary to initiate the paging procedure triggered for the circuit switching domain in the connected status after performing the initial non-access stratum procedure; and
    handling the paging procedure triggered for the circuit switching domain in the connected status and initiated by the network-side device according to the received second paging message.

6. The method of claim 3, further comprising:
    receiving by the user equipment a second paging message which corresponds to a paging procedure triggered for the circuit switching domain in a connected status and initiated by the network-side device, when the network-side device determines from the type of the initial non-access stratum procedure initiated by the user equipment that it is necessary to initiate the paging procedure triggered for the circuit switching domain in the connected status after performing the initial non-access stratum procedure; and
    handling the paging procedure triggered for the circuit switching domain in the connected status and initiated by the network-side device according to the received second paging message.

7. The method of claim 1, wherein when the type of the initial non-access stratum procedure is a Service Request procedure, the user equipment determines the way in which:
    the initial non-access stratum procedure is ignored and the paging procedure corresponding to the first paging message is handled if the user equipment accepts a paging request corresponding to the first paging message; or
    the paging procedure corresponding to the first paging message is ignored and the initial non-access stratum procedure is handled if the user equipment rejects the paging request corresponding to the first paging message.

8. The method of claim 7, further comprising:
    receiving by the user equipment a second paging message which corresponds to a paging procedure triggered for the circuit switching domain in a connected status and initiated by the network-side device, when the network-side device determines from the type of the initial non-access stratum procedure initiated by the user equipment that it is necessary to initiate the paging procedure triggered for the circuit switching domain in the connected status after performing the initial non-access stratum procedure; and
    handling the paging procedure triggered for the circuit switching domain in the connected status and initiated by the network-side device according to the received second paging message.

9. A user equipment, comprising:
    a reception unit configured to receive a first paging message transmitted from a network-side device;

a judgment unit configured to judge whether a paging procedure corresponding to the first paging message received by the reception unit is triggered for a circuit switching domain and whether the user equipment is going to initiate an initial non-access stratum procedure;

a determination unit configured to determine from the type of the initial non-access stratum procedure the way in which the paging procedure corresponding to the first paging message and the initial non-access stratum procedure is handled when the judgment unit judges that the paging procedure corresponding to the first paging message received by the reception unit is triggered for the circuit switching domain and that the user equipment is going to initiate the initial non-access stratum procedure; and a handling unit configured to handle the paging procedure corresponding to the first paging message and the initial non-access stratum procedure in the way determined by the determination unit.

10. The user equipment of claim 9, wherein the determination unit determines the way in which the paging procedure corresponding to the first paging message is ignored and a Detach procedure is initiated when the type of the initial non-access stratum procedure is a Detach procedure.

11. The user equipment of claim 9, wherein the determination unit determines the way in which the paging procedure corresponding to the first paging message is ignored and a Tracking Area Update procedure carrying an "active" indicator is initiated when the type of the initial non-access stratum procedure is a Tracking Area Update procedure.

12. The user equipment of claim 11, wherein the paging procedure corresponding to the first paging message comprises a Service Request procedure.

13. The user equipment of claim 12, wherein,
the reception unit is further configured to receive a second paging message which corresponds to a paging procedure triggered for the circuit switching domain in a connected status and initiated by the network-side device, when the network-side device determines from the type of the initial non-access stratum procedure initiated by the user equipment that it is necessary to initiate the paging procedure triggered for the circuit switching domain in the connected status after performing the initial non-access stratum procedure; and
the handling unit is further configured to handle the paging procedure triggered for the circuit switching domain in the connected status and initiated by the network-side device according to the received second paging message.

14. The user equipment of claim 11, wherein,
the reception unit is further configured to receive a second paging message which corresponds to a paging procedure triggered for the circuit switching domain in a connected status and initiated by the network-side device, when the network-side device determines from the type of the initial non-access stratum procedure initiated by the user equipment that it is necessary to initiate the paging procedure triggered for the circuit switching domain in the connected status after performing the initial non-access stratum procedure; and
the handling unit is further configured to handle the paging procedure triggered for the circuit switching domain in the connected status and initiated by the network-side device according to the received second paging message.

15. The user equipment of claim 9, wherein when the type of the initial non-access stratum procedure is a Service Request procedure, the determination unit determines the way in which:
the initial non-access stratum procedure is ignored and the paging procedure corresponding to the first paging message is handled if the user equipment accepts a paging request corresponding to the first paging message; or
the paging procedure corresponding to the first paging message is ignored and the initial non-access stratum procedure is handled if the user equipment rejects the paging request corresponding to the first paging message.

16. The user equipment of claim 15, wherein,
the reception unit is further configured to receive a second paging message which corresponds to a paging procedure triggered for the circuit switching domain in a connected status and initiated by the network-side device, when the network-side device determines from the type of the initial non-access stratum procedure initiated by the user equipment that it is necessary to initiate the paging procedure triggered for the circuit switching domain in the connected status after performing the initial non-access stratum procedure; and
the handling unit is further configured to handle the paging procedure triggered for the circuit switching domain in the connected status and initiated by the network-side device according to the received second paging message.

17. An Evolved Packet System, EPS, mobility management device, comprising:
a transmission unit configured to transmit a first paging message to a user equipment, wherein a paging procedure corresponding to the first paging message is triggered for a circuit switching domain;
a reception unit configured to receive a response message corresponding to the first paging message transmitted from the user equipment or a message corresponding to an initial non-access stratum procedure initiated by the user equipment;
a first handling unit configured to handle the paging procedure corresponding to the first paging message when the reception unit receives the response message corresponding to the first paging message transmitted from the user equipment; and
a second handling unit configured to handle the initial non-access stratum procedure initiated by the user equipment when the reception unit receives the message corresponding to the initial non-access stratum procedure initiated by the user equipment.

18. The device of claim 17, further comprising:
a judgment unit configured to judge from the type of the initial non-access stratum procedure whether it is necessary to initiate a paging procedure triggered for the circuit switching domain in a connected status after the second handling unit performs the initial non-access stratum procedure; and
a procedure initiation unit configured to initiate the paging procedure in the connected status in the circuit switching domain and transmit to the user equipment a second paging message corresponding to the initiated paging procedure triggered for the circuit switching domain in the connected status when the judgment unit judges that it is necessary to initiate the paging procedure triggered for the circuit switching domain in the connected status.

19. The device of claim 18, wherein the judgment unit judges that it is not necessary to initiate the paging procedure triggered for the circuit switching domain in the connected status when the type of the initial non-access stratum procedure is a Detach procedure.

20. The device of claim 18, wherein the judgment unit judges that it is necessary to initiate the paging procedure triggered for the circuit switching domain in the connected status when the type of the initial non-access stratum procedure is a Tracking Area Update procedure or a Service Request procedure.

* * * * *